(12) United States Patent
Eriksson

(10) Patent No.: US 6,196,535 B1
(45) Date of Patent: Mar. 6, 2001

(54) PRECISION CLAMPING DEVICE

(75) Inventor: Mark L. Eriksson, St. Cloud, MN (US)

(73) Assignee: Talon Engineering Corp., Sauk Rapids, MN (US)

( * ) Notice: Subject to any disclaimer, the term of this patent is extended or adjusted under 35 U.S.C. 154(b) by 0 days.

(21) Appl. No.: 09/251,088

(22) Filed: Feb. 16, 1999

(30) Foreign Application Priority Data

Feb. 19, 1998 (DE) .............................. 198 06 961

(51) Int. Cl.[7] .................................................. B25B 1/08
(52) U.S. Cl. .............................................. 269/229; 29/234
(58) Field of Search .................................. 269/229, 234, 269/224, 228

(56) References Cited

U.S. PATENT DOCUMENTS

| | | | |
|---|---|---|---|
| 2,850,926 | * | 9/1958 | Jobe ...................................... 269/229 |
| 3,512,325 | * | 5/1970 | Nichols ................................ 269/234 |
| 4,804,171 | * | 2/1989 | Dornfeld .............................. 269/234 |
| 5,605,179 | | 2/1997 | Strong, Jr. et al. . |
| 5,836,355 | | 11/1998 | Markulec, Jr. et al. . |

FOREIGN PATENT DOCUMENTS

1502939 * 3/1978 (GB) .................................. 269/228

* cited by examiner

*Primary Examiner*—David A. Scherbel
*Assistant Examiner*—Daniel Shanley
(74) *Attorney, Agent, or Firm*—Schwegman, Lundberg, Woessner & Kluth, P.A.

(57) ABSTRACT

A clamping device and method wherein the device comprises a movable jaw and a fixed jaw wherein the movable jaw is displaced toward the fixed jaw along a plurality of load points. In one embodiment, the displacing action is through a plurality of inclined plane or ramp surfaces. In another embodiment, the displacing action is through a camming surface. A biasing mechanism is also provided to apply a consistent, predictable clamping force to a group of objects retained between the movable jaw and the fixed jaw. A low friction surface or coating on the jaws permit movement of the objects transverse to the clamping force while clamped.

35 Claims, 7 Drawing Sheets

PRECISION CLAMPING DEVICE

FIELD OF THE INVENTION

The present invention relates generally to an apparatus and method for applying force to an object or group of objects. More particularly, it pertains to a device for applying a repeatable and precise clamping force to a series of fluidic blocks.

BACKGROUND OF THE INVENTION

In manufacturing semiconductors, impurities are sometimes introduced to the semiconductor base material through a process known as "doping." Doping permits the fabrication of n-type or p-type semiconductors with varying degrees of conductivity. In general, the greater the extent of doping, the higher the conductivity of the semiconductor device.

Dopants are often introduced to the process in the form of gases. These gases are used to deposit or remove materials on the surface of the semiconductor device in order to provide insulating regions and connective features required by the semiconductor architecture. The gases used during these processes include, among others, HCl, HBr, tungsten hexafluoride, and silane. These gases are extremely toxic and/or corrosive and/or pyrophoric (i.e., may explode or burn upon contact with an oxidizer such as room air), and therefore must be carefully controlled and contained within gas conduit systems that are leakproof.

When dealing with these semiconductor gas conduit systems, it is advantageous to minimize the area contacted by the gases (the "wetted surface area") so as to reduce or minimize contamination of the gases. Contamination typically occurs as a result of water vapor which desorbs from the surfaces of the gas conduit and control components. This contamination is typically introduced at the time of installation or following maintenance operations that expose the wetted surface areas to air.

Furthermore, because welded surfaces alter the surface chemistry and have an inherent propensity to corrode, it is advantageous to minimize the number and size of welded surfaces within the gas conduit system.

One method of achieving the dual objectives of reducing surface area and reducing the number and size of welded surfaces is described in U.S. Pat. No. 5,836,355 issued to Markulec et. al. on Nov. 17, 1998. The '355 patent relates to an integrated gas conduit system or "gas panel" which includes a series of linear assemblies each comprising a plurality of interconnected, discreet blocks. The blocks are coupled such that one or more ports within each block is in fluid communication with one or more ports of another block or blocks such that a pressurized fluid may flow therebetween. Metal gaskets disposed between the blocks and around the ports form an effective seal, thus containing the fluids therein. Threaded rods or bolts passing longitudinally through the blocks secure each linear assembly.

While the '355 patent provides a gas panel which minimizes welds and wetted surface area, the discreet blocks that make up the panel must be precisely aligned in order to prevent leakage. Referring to FIG. 9, the gas panel is comprised of two layers of linear block assemblies 600 and 700, one layer oriented transversely to the other. One or more discreet blocks 601 may have porting to not only adjacent blocks 602, 603 within the linear assembly, but also to other blocks 701 mounted transversely thereto. In order to ensure effective sealing at all interfaces, it is critical that the individual linear assemblies 600, each comprised of a plurality of blocks, ports 605, metal gaskets 604, and bolts 606 (the latter required to compress and seal the blocks and gaskets), be aligned precisely not only along their longitudinal or "x" axis but transversely as well (the "y" and "z" axes). Each block of each linear assembly 600 is dimensionally similar such that alignment of the outside surfaces 607 ensures alignment of the internal porting 605.

Many times the blocks are difficult to align and, unfortunately, even slight misalignment can result in gasket leakage. For example, if two adjacent blocks 601 and 602 of the linear assembly 600 are misaligned along the z axis by 0.005 inches and the assembly 600 is subsequently bolted to the two blocks 701 and 702 of two transverse assemblies 700, the act of bolting the blocks 601 and 602 to the assemblies 700 (using the bolts 608) will force the lower faces of the blocks 601 and 602 to the mating faces of the blocks 701 and 702 respectively. Due to the misalignment between the blocks 601 and 602, a shear strain on the metal gasket between those blocks will develop. When metal gaskets of this type are sheared, seal integrity is sacrificed. The effects of even partial seal failure include: compromising the semiconductor process; damaging gas system components; and potentially inflicting serious injury or even death to system operators.

Accordingly, a clamping device that can precisely align the blocks in the y and z directions is advantageous to produce these linear assemblies. At the same time, the device must permit relative motion between the blocks of the linear assembly (i.e., in the x direction) so that they may draw together and compress the metal gaskets. Currently available alignment methods use various devices to clamp the blocks between two faces before bolting. These devices, however, do not always produce a repeatable clamp force. If the clamp force exerted on the blocks is not repeatable, the frictional forces between the blocks and the clamp are likewise not repeatable. If the clamp force is too high, the frictional forces on the blocks will prevent the blocks from drawing together and forming a hermetic seal. If the clamp force is too low, the act of torquing the bolts 606 will induce a torsional moment into the linear assembly, resulting in sheared gaskets and misaligned blocks. Unfortunately, the need to minimize the frictional forces on the blocks is at odds with the need to sufficiently restrain the blocks during torquing.

Another problem with conventional clamping devices is that the clamp devices have only one point of loading. Thus, if the blocks are placed off-center from the loading point, the clamping faces will become skewed (i.e., not parallel). This will also produce a variation in the clamp load applied and adversely impact alignment and sealing.

Accordingly, what is needed is a way to apply a consistent and predictable clamping force to a group of objects while maintaining precise alignment therebetween. What is further needed is a device that can apply such a clamping force without overly restricting relative motion of the objects transverse to the clamping force.

SUMMARY OF THE INVENTION

A precision clamping device and method is disclosed. In one embodiment, the precision clamping device comprises: a first clamp face; a second clamp face, the second clamp face in an opposing, substantially parallel relationship to the first clamp face; a displacing mechanism adapted to move the first clamp face toward the second clamp face, wherein the second clamp face remains substantially parallel at all times to the first clamp face; and a biasing mechanism coupled to the displacing mechanism, wherein the biasing mechanism is adapted to provide a substantially repeatable clamp force to an object or group of objects placed between the first clamp face and the second clamp face.

The method for assembling a plurality of objects is also disclosed comprising, in one embodiment: placing a plurality of objects onto a surface of a clamping device between a first clamp face and a second opposing and substantially parallel clamp face; actuating a displacing mechanism, thereby displacing the first clamp face towards the second clamp face; contacting the objects between the first clamp face and the second clamp face; and biasing the first clamp face toward the second clamp face, thereby applying a uniform clamping force to the objects.

In another embodiment, the device comprises a fixed jaw having a first clamp face; a movable jaw having a second opposing clamp face substantially parallel to the first clamp face, the movable jaw adapted to move in a first direction whereby the second clamp face moves towards the first clamp face, wherein the movable jaw has a first plurality of inclines each having a first angle; and a slide member having a second plurality of inclines each having a second angle, the slide member adapted to move in a second direction transverse to the first direction, wherein the second plurality of inclines is in sliding engagement with the first plurality of inclines such that the movable jaw moves in said first direction in response to movement of the slide member in said second direction.

In yet another embodiment, a tool for applying a uniform clamping force is disclosed comprising: a fixed jaw having a first clamp face; a movable jaw having a second clamp face substantially parallel to the first clamp face. The movable jaw may be adapted to move in a first direction whereby the second clamp face moves towards the first clamp face, wherein the movable jaw has a first plurality of inclines each having a first angle, and wherein an opening is provided between the first clamp face and the second clamp face. The opening is adapted to receive a plurality of fluidic blocks therein. The tool may also comprise a slide member having a second plurality of inclines each having a second angle substantially equal to the first angle, the slide member adapted to move in a second direction transverse to the first direction, wherein the second plurality of inclines is in sliding engagement with the first plurality of inclines such that the movable jaw moves in said first direction in response to movement of the slide member in said second direction. A base may operatively supporting the fixed jaw, movable jaw, and slide member.

In still yet another embodiment, a precision clamping device is disclosed comprising: a fixed jaw having a first clamp face; a movable jaw having a second, opposing clamp face substantially parallel to the first clamp face, the movable jaw adapted to move in a first direction whereby the second clamp face moves towards the first clamp face; and a displacing mechanism comprising one or more camming members, the camming members adapted to contact the movable jaw on a side opposite the second clamp face, wherein the camming members displace the movable jaw in the first direction.

Advantageously, the provided device allows for a repeatable, consistent, and controllable force to be applied to a group of objects such as fluidic blocks. Furthermore, the device permits movement of the blocks transverse to the clamp load while subjected to the clamp load. The consistent force allows for the fluid passages of the blocks to be precisely aligned, thereby preventing leakage of potentially toxic and corrosive gases.

BRIEF DESCRIPTION OF THE DRAWINGS

FIG. 2A is an enlarged partial view of the precision clamping device of FIG. 2;

DESCRIPTION OF THE PREFERRED EMBODIMENTS

In the following detailed description, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense.

Figure 1:
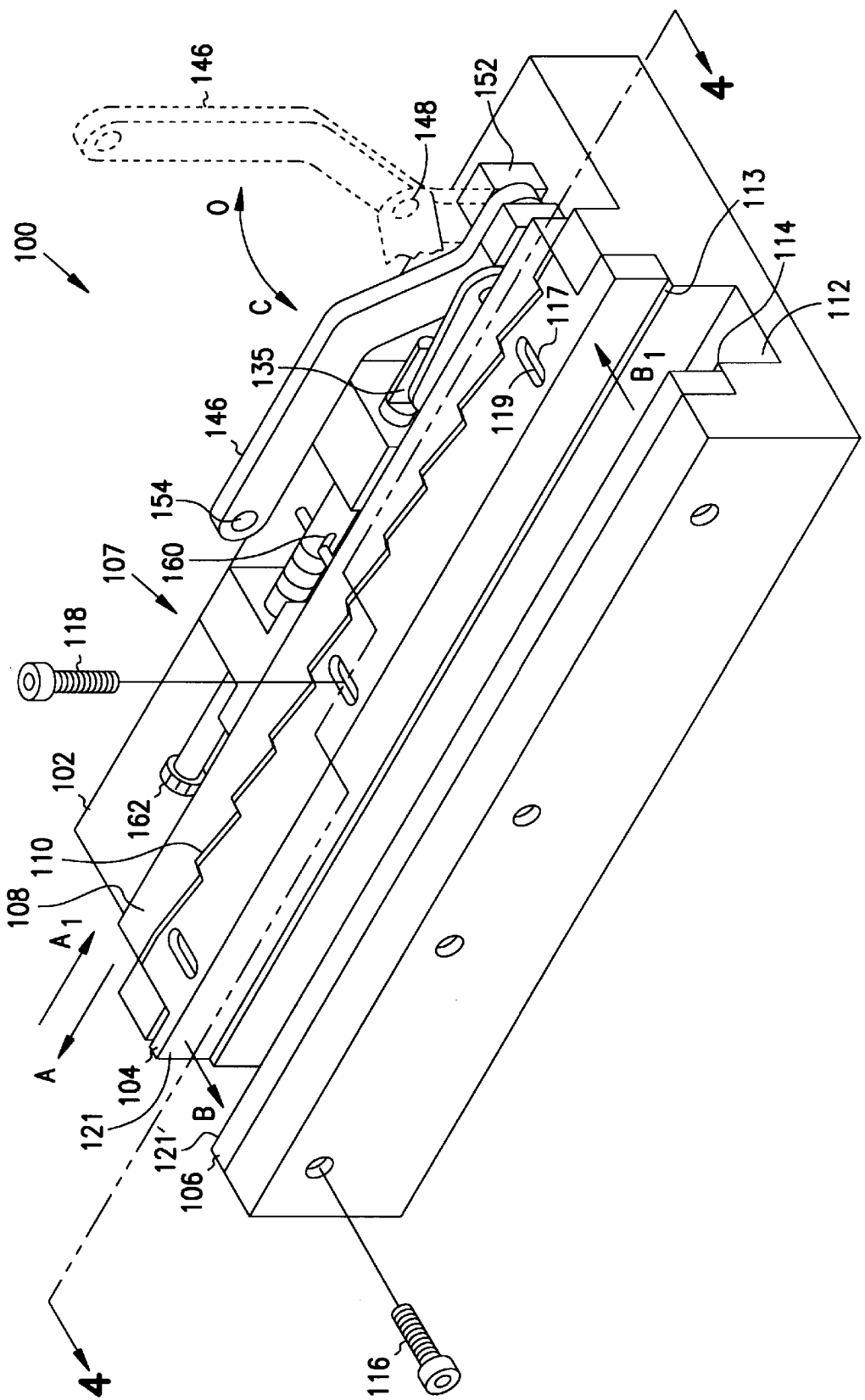
FIG. 1 is a perspective view illustrating an embodiment of a precision clamping device constructed in accordance with the present invention.

Referring generally to FIG. 1, a precision clamping device or tool fixture is disclosed. In one exemplary embodiment, the clamping device 100 is adapted to secure a plurality of fluidic modules or blocks to form a linear gas conduit assembly as further described herein. While described as a clamping device, those skilled in the art will realize that the present invention could be applied to other devices having similar controlled force requirements. The device 100 comprises a base 102 which operatively supports a movable jaw 104 and a fixed jaw 106 each having a clamp face 121 and 121' respectively, wherein the clamp faces are in a parallel, opposing relationship to one another. The movable jaw 104 and the fixed jaw 106 may be referred to herein simply as jaws or jaw members. One or more objects such as fluidic blocks 300 (see FIG. 3) having a substantially identical width 308 transverse to the clamp faces may be placed between the jaws 104, 106. The movable jaw 104 may then be displaced with the aid of a displacing mechanism 107 toward the fixed jaw 106 as shown by the directional arrow "B" until it contacts the objects. Once contacted, a biasing mechanism or member (discussed in detail below) proceeds to apply a precise, predetermined clamp load to the objects. The clamp faces 121, 121' of the jaws 104 and 106 may have a friction reducing surface or coating adapted to permit the objects to move more easily in a direction transverse to the clamp load even while subjected to the clamp load.

The device 100 utilizes multiple load points to evenly load the objects. That is, the clamping force is imparted at multiple points along the entire clamp face 121 of the movable jaw 104. Accordingly, even if the objects are asymmetrically loaded within the device 100, the same predetermined clamp load will still be applied and the clamp faces 121, 121' will still remain parallel to one another. Thus, the clamping device 100 of the present invention offers precise repeatability of the clamp load from one group of similar objects to the next regardless of the position of the objects within the clamp device.

Having provided this brief overview, attention will now be focused on exemplary embodiments of the invention. In one embodiment, the movable jaw 104 is displace toward the fixed jaw 106 by the interrelation of the movable jaw 104 and a slide member 108. The slide member 108 is restricted to motion along a line generally represented by "A" in FIG. 1. The slide member 108 and the movable jaw 104 both include a series of interengaging "saw teeth" inclines or ramps 110 which cooperate with the displacing mechanism 107 to move the movable jaw 104. Operatively attached to the slide member 108 opposite the ramps 110 is the displacing mechanism 107. The displacing mechanism permits the tool operator to move the slide member 108 in the "A" direction. As the slide member moves, the inclines or ramps 110 cause the movable jaw 104 to move in the "B" direction, clamping the objects (not shown) between the jaw members. The displacing mechanism is broadly defined to include those interrelating components that effectively permit movement of the clamp faces towards one another. A biasing mechanism, further described below, may be also be included as either a separate or integral part of the displacing mechanism. As will become clear, the combination of these components results in a clamping device that provides a predictable and repeatable clamp force across the entire clamp face of the jaw members.

Figure 2:
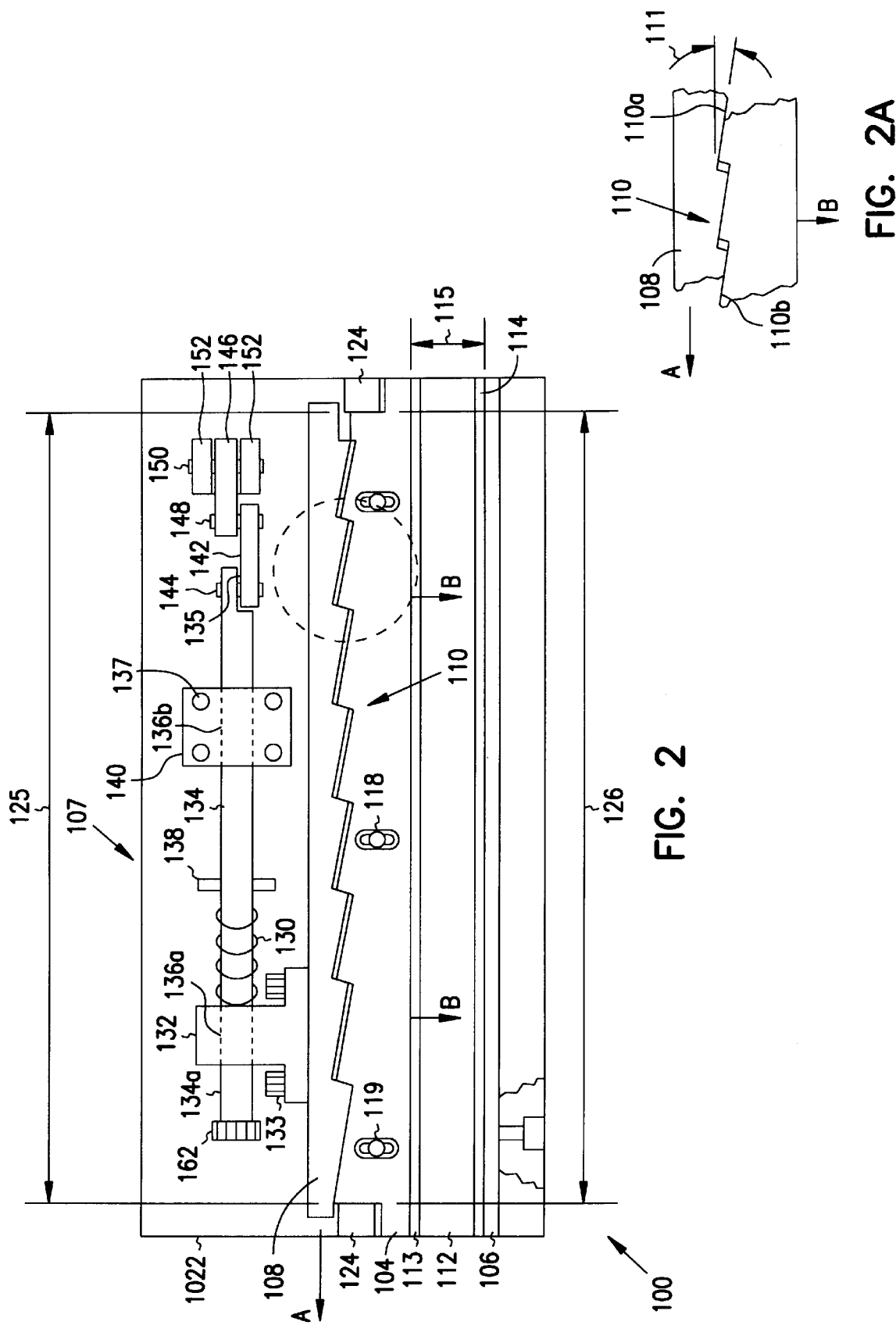
FIG. 2 is a partial top plan view illustrating the precision clamping device of FIG. 1.

Now referring to FIG. 2, a top view of the clamping device 100 is shown. The displacing mechanism 107 is more clearly visible in this view. FIG. 2A shows an enlarged partial plan view of the ramps 110.

Figure 3:
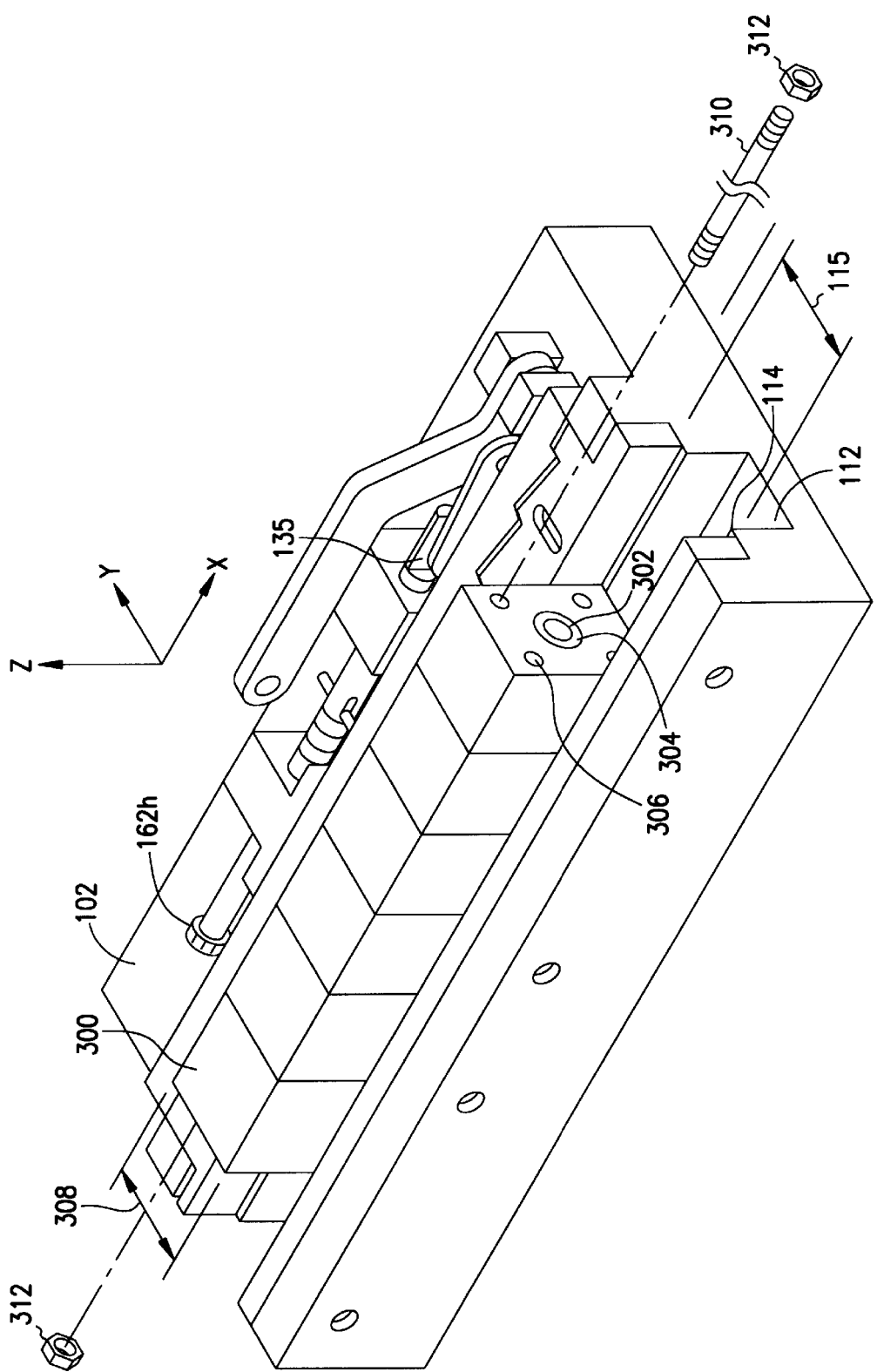
FIG. 3 is a perspective view of the precision clamping device of FIG. 1 with a series of fluidic blocks placed therein.
Figure 9:
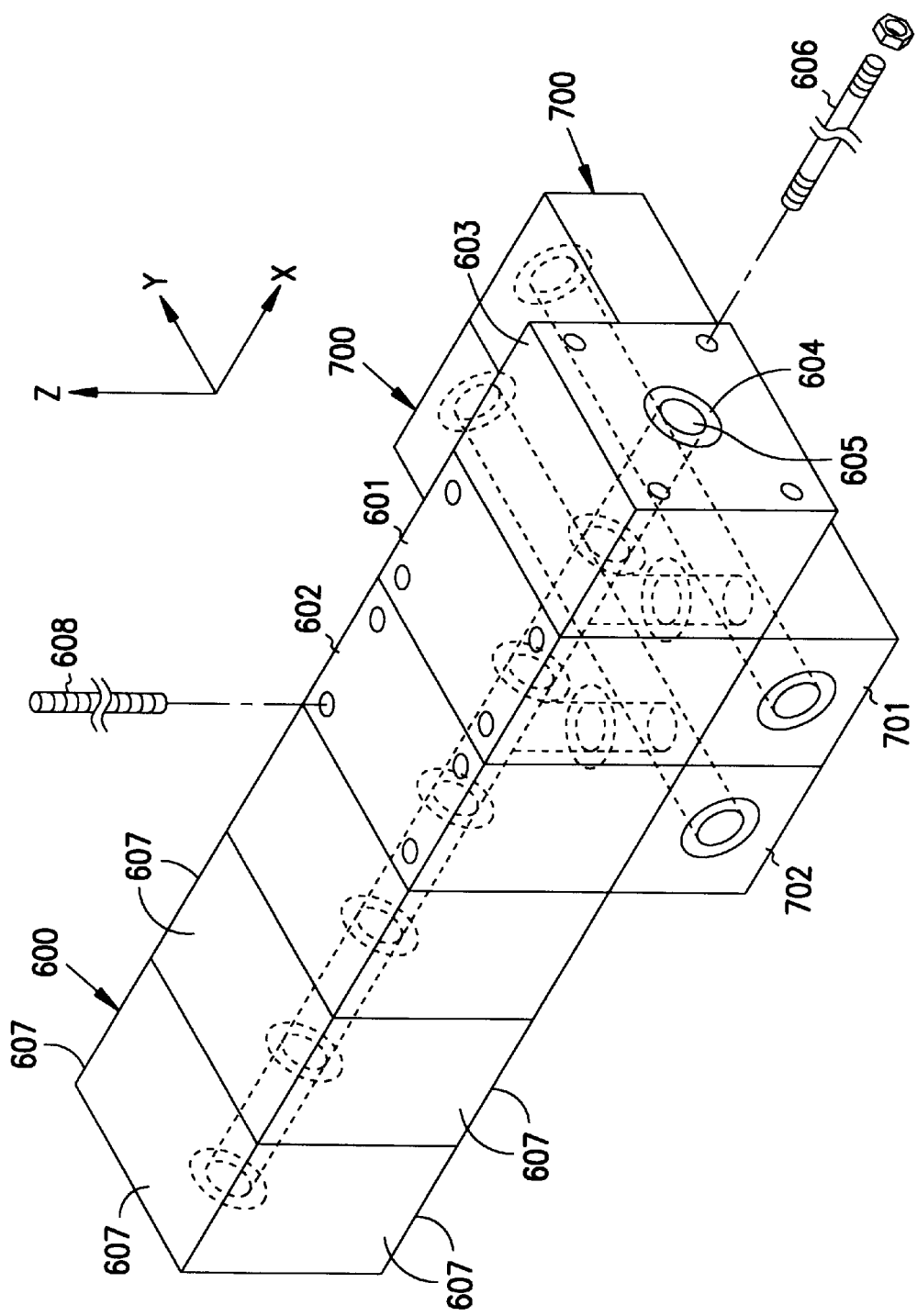
FIG. 9 is a perspective view of a plurality of fluidic blocks as they may be attached to form separate linear assemblies.

Referring to FIG. 3, the clamping device 100 is shown with the process gas modules or fluidic blocks 300 therein. Once assembled, the blocks 300 form a linear gas conduit assembly. These linear assemblies may be combined with other linear assemblies mounted transversely thereto and to other system components such as valves and regulators to form a "gas panel" (see FIG. 9). Each block 300 can perform a specific porting or interconnect function and each may be mixed and matched with others to create linear assemblies of varying functionality. Each block has at least one port 302 surrounded by a machined sealing feature 303 that accommodates, between any two blocks, a metal seal or gasket 304. Each block has a width 308 substantially identical to the other blocks. In addition, the ports 302 are similarly located on each block such that alignment of the outside surfaces of the blocks 300 accurately aligns the ports. Thus, when inserted into the clamping device 100 and clamped as described below, the blocks are aligned such that ports 302 may be properly sealed by the gaskets 304.

Having described the clamping device 100 generally, attention will now be focused on particular aspects of one exemplary embodiment of the invention as illustrated in FIGS. 1–5. Referring once again to FIG. 1, the base 102 forms the primary support structure for the device 100. The base is substantially rectangular and includes features that permit attachment of the various components thereto. A slot 112 is formed on the upper side of the base 102 between the clamp faces 121, 121'. It is important to note that while frequent reference is made herein to relative directions such as "up" and "down" or "horizontal" and "vertical," it is to be understood that these references are provided for descriptive purposes only and are not intended to limit the scope of the invention. The slot 112 is adapted to receive the fluidic blocks 300 as shown in FIG. 3.

Still referring to FIG. 1, one side of the base 102 forms a support for the fixed jaw member 106. The jaw member 106 is a metal strip having a substantially rectangular cross section forming the clamp face 121'. It sits on a first ledge 114 and is held in place with a series of fasteners 116. The first ledge 114 extends inwardly into the slot 112 beyond the edge of the fixed jaw member 106 as generally represented in the figures. While the fixed jaw 106 is described herein as attached with fasteners, other retainment methods (e.g., tongue and groove, weld, adhesives) are also possible. Similarly, the fixed jaw 106 may be integral to the base 102 rather than constructed as a separate piece. The fixed jaw 106 may also be produced from other non-metallic materials.

Figure 4:
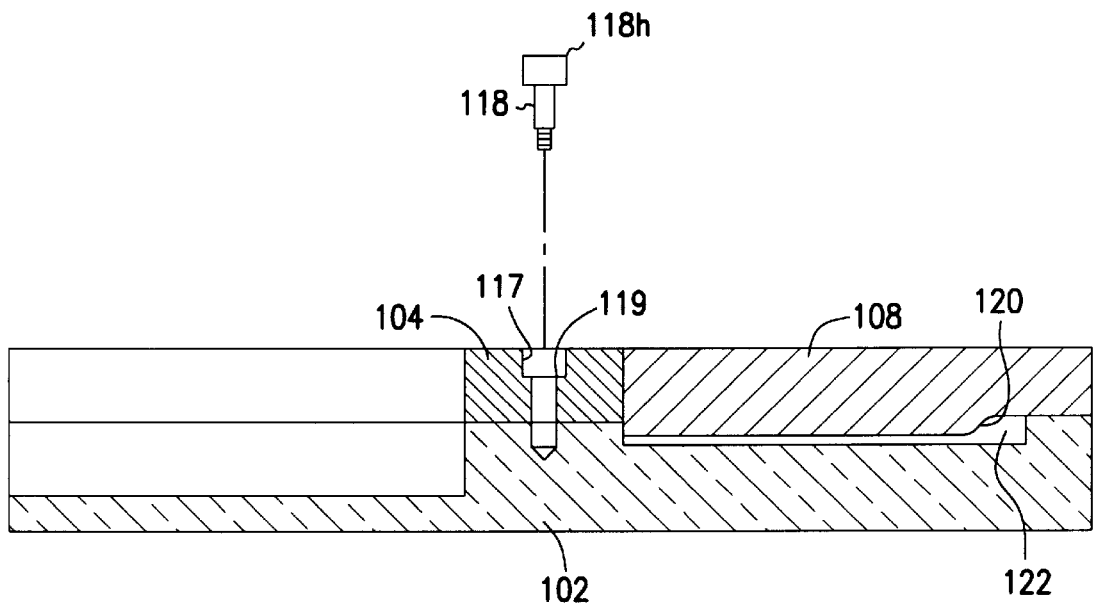
FIG. 4 is a partial section view taken along lines 4—4 of FIG. 1.

As shown in FIG. 1, the movable jaw 104 is disposed opposite to the fixed jaw 106. Like the fixed jaw, the movable jaw 104 sits on a second ledge 113 that extends beyond the jaw into the slot 112. The ledges 113 and 114 are substantially coplanar. The jaw members are separated by a clamp distance 115 (best shown in FIG. 2). The movable jaw 104 is a more complex part than the fixed jaw and will be described in conjunction with the slide member 108 as depicted in FIG. 1. The movable jaw 104 has a first planar side or clamp face 121 substantially parallel to the fixed jaw clamp face 121'. The movable jaw has a second side defining the ramps 110 which are described in more detail below. The movable jaw is attached to the base by a plurality of fasteners 118. As shown in FIG. 4, the fasteners 118 may be conventional shoulder bolts that can bolt securely through a slot 119 to the base 102 without generating a downward bolt load (from the bolt head 118h) on the movable jaw 104. The bolt head 118h may be recessed within a depression 117 formed around the slot 119. The fasteners 118 act as first guiding features and restrain the movable jaw from motion in the "A" direction while permitting motion in the "B" direction. As shown in FIG. 2, a pair of tabs 124 separated by a tab separation 125 may extend upwardly from the base on each side of the jaw 104. The jaw 104, correspondingly, may have a control width 126 which is slightly smaller than the tab separation 125. Thus, the movable jaw 104 is also restrained from movement in the "A" direction by the tabs 124.

Referring now to FIG. 2, adjacent to the moving jaw 104 is the slide member 108. The slide member 108 is adapted to move in the "A" direction. To limit the motion of the slide member 108, it incorporates a second guiding feature or integral tab 120 as shown in FIG. 4. The tab 120 engages a slot 122 in the base. The tab and slot arrangement permit precise movement of the slide member 108 in the "A" direction but restrain movement in the "B" direction. Those of skill in the art will realize that the tab and slot can be reversed (i.e., the slot may be incorporated on the slide member and the tab on the base).

Now referring to FIGS. 2 and 2A, the movable jaw 104 and the slide member 108 interface to one another at one or more inclines or ramps 110. The ramps 110 are inclined planes integrally formed into the movable jaw 104 and slide member 108. To clarify the remainder of this discussion, the ramp surfaces located on the slide member 108 will be referred to as surfaces 110a while the ramp surfaces on movable jaw 104 will be referred to as surfaces 110b. While a plurality of interengaging ramps 110 are shown in FIGS. 2 and 2A, each ramp is substantially identical in size and angular development such that each of the surfaces 110a and 110b of each ramp are similarly engaged.

When the slide member 108 is displaced in the "A" direction, ramps 110a slide along ramps 110b as shown in FIG. 2A. As the slide member moves, the ramps 110a impart a displacing force to the ramps 110b of the movable jaw 104. This displacing force causes corresponding movement of the movable jaw 104 in the "B" direction. That is, displacement of the slide member 108 in the "A" direction results in movement of the jaw member 104 in the "B" direction.

The force imparted by the ramps 110a is normal to the ramps 110b. Thus, a small component force is applied to the movable jaw 104 in the "A" direction. However, the fasteners 118 prevent motion of the jaw member 104 in all but the "B" direction. That is, the force component on the movable jaw in the "A" direction is reacted by the fasteners 118. The tabs 124 may also prevent motion of the movable jaw 104 in the "A" direction. The component of force in the "A" direction that is imparted to the movable jaw 104 is minimized by utilizing a shallow ramp angle 111 (see FIG. 2A). In the first exemplary embodiment, the ramp angle 111 is 10°. However, other angles are also considered within the scope of the invention. A larger angle, for example, will result in greater displacement of the movable jaw 104 for a given displacement of the slide member 108. In one exemplary embodiment, the sliding member 108 moves approximately 0.28 inches and the movable jaw moves approximately 0.05 inches. Furthermore, the number of ramps may be altered without departing from the scope of the invention. By providing a plurality of ramps 110, the movable jaw is loaded at a plurality of load points rather than at one load point as conventional linear screw clamps provide. This provides even, parallel loading across the entire clamp face 121 even if the blocks 300 are placed asymmetrically within the device 100. The number of ramps provided may vary depending on the length of the clamp faces 121, 121' and on application requirements.

Referring generally to FIG. 2, one embodiment of the displacing mechanism 107 will now be described. The reader is once again reminded that other mechanisms may be used to achieve substantially the same result without departing from the scope of the invention.

The displacing mechanism 107, in one embodiment, may also include a biasing mechanism comprising a biasing member and a connection member. As shown in FIG. 2, the biasing member may be a compression spring 130 and the connection member may be a T-block 132 wherein the latter is connected to the slide member 108 by fasteners 133. The spring 130 biases the T-block 132, and thus the slide member 108, in the "A" direction as explained below. While described as integral to the displacing mechanism 107, the biasing mechanism may be a separate assembly.

The displacing mechanism 107 further comprises a hollow shaft 134 that supports the spring 130 as the latter is compressed. A first end 134a of the shaft slidably engages the T-block 132 at an aperture 136a. A second end 134b of the shaft 134 passes through a guide block 140 at an aperture 136b and pivotally engages a first end of a link 142 at a pivot joint 144. The guide block 140 fastens to the base 102 with a plurality of fasteners 137. Like the T-block, the guide block slidably receives the shaft 134. The second end 134b has a machined flat 135 (best viewed in FIG. 1) to better accommodate the pivot joint 144.

Located between the T-block 132 and the guide block 140 is an intermediate protrusion which, in one embodiment, is a retaining pin 138. The retaining pin 138 is positioned perpendicularly to the shaft in a longitudinal shaft slot 160 (see FIG. 1). The pin 138 protrudes from the slot 160 and serves to selectively compress the spring 130 against the T-block 132 as shown in FIGS. 1 and 2.

Figure 5:
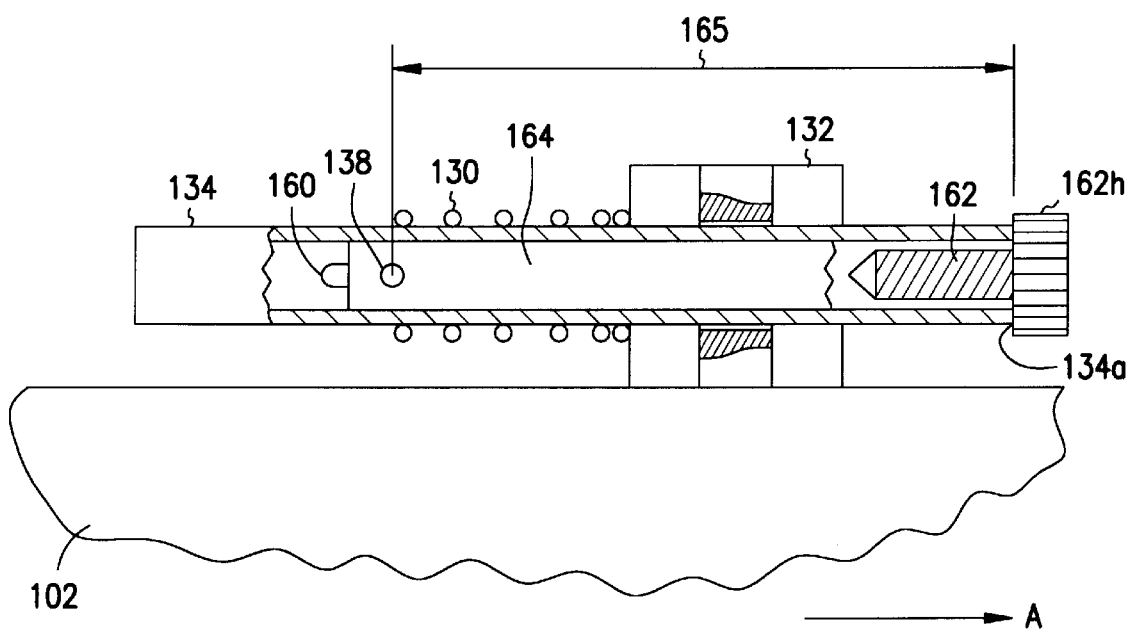
FIG. 5 is a partial cut-away view of a portion of the clamping device of FIG. 1 showing a shaft in accordance with one embodiment of the invention.

Referring now to FIG. 5, the hollow shaft 134 may receive a screw 162 in threaded engagement with a tumbler rod 164. The screw may be a socket head cap screw having a head 162h. The tumbler rod 164 includes an aperture that engages the retaining pin 138 at a distance 165 from the first end 134a of the shaft. By rotating the screw 162, the distance 165 may be varied. Since the location of the pin 138 controls the spring 130 compression, rotation of the screw 162 also varies the spring force. The relative motion between the retaining pin 138 and the shaft 134 is accommodated by the slot 160 which permits the pin to move approximately 0.25 inches.

Referring again to FIG. 2, a handle 146 (which is only partially shown in FIG. 2) is pivotally mounted to the base 102 at a base pivot joint 150 which is formed by a pair of handle tabs 152. A second end of the link 142 attaches to the handle 146 at a pivot joint 148. The handle may also include a hole 154 (best viewed in FIG. 1) which may accept an optional T-handle (not shown).

The clamping device 100 may also include a cover (not shown) that partially covers the displacing mechanism 107 and portions of the slide member 108 and movable jaw 104. However, the cover does not interfere with the insertion and removal of the blocks 300.

The operation of the clamp device 100 according to one embodiment of the invention will now be described. In an initial or unclamped state, the handle 146 is moved to an open position as indicated by "0" in FIG. 1. In this position, the pivot joint 148 is moved upwardly and away from the base 102. As it moves, the link 142 draws the shaft 134 toward the base pivot 150 (to the right in FIG. 2). This movement draws the retaining pin 138 away from the T-block 132, thus relieving the compressive force on the spring 130. As the spring relaxes, the slide member 108 is free to move in the "$A_1$" direction as shown in FIG. 1. As the slide member 108 moves in the "$A_1$" direction, the movable jaw 104 is free to retract or move in the "$B_1$" direction (also shown in FIG. 1).

With the movable jaw fully retracted, the clamp distance 115 (shown in FIG. 2) is at its maximum. The clamp device 100 is then able to receive an object or group of objects to be clamped. To form a linear conduit assembly, the fluidic blocks 300 may then be inserted into the slot 112 as shown in FIG. 3. It is immaterial where the blocks 300 are placed within the slot 112 as the device 100 can maintain parallelism and accurate loading regardless of position. The distance 115 is slightly larger than the block width 308 to accommodate insertion into the device 100. The substantially coplanar ledges 113 and 114 are adapted to support the block width 308 along a bottom surface and maintain alignment of those bottom surfaces during assembly. Those of skill in the art will realize that blocks having a different width 308 may be accommodated by changing the clamp distance 115. Similarly, the overall length and size of the clamping device can be modified to accept blocks of different sizes. Accordingly, other clamping devices that receive a different number or different thickness of blocks are considered to be within the scope of the invention.

Once the blocks 308 are positioned within the device 100, the handle 146 may be moved to the closed position as represented by "C" in FIG. 1. As the handle 146 moves to the closed position, the link 142 and shaft 134 are displaced generally in the "A" direction. As the shaft 134 moves, so does the attached retaining pin 138. When the retaining pin 138 contacts the spring 130, the screw head 162h is brought into an abutting relationship with the first end 134a of the shaft as shown in FIG. 5 (if not already so positioned). The retaining pin 138 then begins to push the spring 130 in the "A" direction. Further displacement of the shaft 134 causes the spring to contact the T-block 132 and produce a biasing force thereon. As the shaft continues to move, the biasing force eventually becomes greater than the resisting frictional forces acting on the T-block 132 and the slide member 108. Consequently, both parts begin to move in the "A" direction.

As previously described, as the slide member moves in the "A" direction, the interrelation of the ramps 110 cause the movable jaw 104 to move in the "B" direction. The movable jaw 104 moves freely in the "B" direction until the clamp face 121 contacts the blocks 300. Once the blocks 300 are contacted, they are forced against the opposing clamp face 121' and clamped. Once clamped, further movement of the movable jaw 104 and the slide member/T-block is generally prohibited. However, the shaft 134 and retaining pin 138 continue to move, compressing the spring 130 against the T-block 132 to provide a biasing or spring force to the slide member 108 and movable jaw 104. As the handle 146 reaches the "C" position (see FIG. 1), the pivot joint 148 goes "over-center." That is, the handle rotates such that the pivot joint 148 is beneath a plane passing through the pivot joint 144 and the base pivot 150. In this over-center position, forces exerted by the spring 130 that would tend to displace the shaft 134 in the "$A_1$" direction are unable to rotate the handle 146 toward the "0" position. Thus, the shaft 134 is generally fixed and prohibited from motion once the handle reaches the "C" position. While described herein as an over-center mechanism, other mechanisms may also be used to retain the shaft 134.

The spring 130 and the relative location of the retaining pin 138 are selected to provide a predetermined spring force when the handle is in the closed position. The spring force generated is dependent on the amount of displacement required of the movable jaw member 104. For instance, if the gas block width 308 were small relative to the clamp distance 115, the movable jaw 104 would have to move a greater distance in the "B" direction. The slide member 108 would have to move a correspondingly greater distance in the "A" direction. Therefore, the spring 130 and the location of the retaining pin 138 must be carefully selected based on several variables including but not limited to: the block width; the clamp separation 115; and the clamp load desired.

In one embodiment, the screw 162 provides an adjustment feature permitting adjustment of the clamp load. Specifically, rotation of the screw changes the distance 165 as shown in FIG. 5 and thus, the compression on the spring 130. For example, turning the screw in a first direction results in an increase in the distance 165 and accordingly, less compression on the spring. Rotation of the screw in a second direction reduces the distance 165, resulting in increased compression on the spring. Accordingly, spring force, and thus clamp load magnitude, are adjustable merely by turning the screw 162.

The spring 130 applies a repeatable biasing force to the T-block 132 and slide member 108 because the spring compression is substantially identical for each set of blocks clamped. By providing a consistent and repeatable biasing force to the slide member, a consistent and repeatable clamp force is applied to the blocks 300. This repeatable clamp load permits accurate alignment of the ports 302 and compression of the gaskets 304.

Once the fluidic blocks 300 are clamped, the blocks may be secured by a plurality of threaded rods 310 passing longitudinally through the blocks as shown in FIG. 3. Each rod is secured at each end by a nut 312. The nuts 312 may be torqued to an appropriate value preferably in an alternating fashion to ensure equal loading. The clamping device 100 provides adequate block loading to maintain alignment during torquing of the nuts 312. However, as the nuts 312 are tightened, the blocks can slide in the longitudinal or "D" direction as shown in FIG. 3. Movement in this direction is necessary to permit the individual blocks 300 to draw together and seal properly as the rods 310 are tightened. The clamp faces 121, 121' are adapted to permit such longitudinal motion of the blocks by the inclusion of a friction reducing surface or coating. This coating effectively lowers the coefficient of friction between the clamp faces and the blocks 300. In one embodiment, the friction reducing coating is a non-contaminating (i.e., dry film impregnated) modified tungsten disulfide lubricant available under the trade name DICRONITE®. In addition to its low friction characteristics, this coating also enhances durability and wear resistance. Furthermore, by reducing the coefficient of friction, the coating permits the blocks to move in the "D" direction while under a substantial clamping load. For instance, in one embodiment, two or more blocks are able to adequately draw together when held under a clamp load of 250 lbs. DICRONITE® provides a reduction in the coefficient of static friction to approximately 0.05. This compares to approximately 0.15 for bare, smooth metal-on-metal contact. While DICRONITE® is described herein, other friction reducing coatings and surfaces are also within the scope of the invention.

The friction reducing coating may be applied to the clamp faces 121, 121' of the jaw members 104 and 106 respectively. Alternatively, it may be applied to the parts in their entirety. Another option is to apply the coating to the slide member 108 as well. The latter will reduce frictional forces on the ramps 110. By applying the coating to the movable jaw 104, the fixed jaw 106, and the slide member 108, substantially all friction surfaces are effectively treated.

To further reduce friction and minimize wear, the jaw members 104, 106 may be hardened and ground to present very smooth clamp faces 121, 121' to the blocks 300. This hardened surface also prevents impression by the blocks into the surface of the jaw members during clamping, thus extending their useful life.

One potential material for construction of the jaws 104, 106 is 17-4PH stainless steel as this is an acceptable material for use in semiconductor clean rooms. However, other materials may also be used without departing from the scope of the invention.

When the nuts 312 are fully and evenly torqued, the handle 146 may be moved once again to the "0" position as indicated in FIG. 1. This will relieve the clamp force and permit the operator to remove the now assembled linear gas conduit assembly. Another group of blocks may then be clamped as described above.

By applying the clamp force over several ramps 110, the device 100 can maintain parallelism between the clamp faces 121, 121' under extreme asymmetric loading. For instance, in one embodiment, the parallelism was measured to be 0.001 inches over a 12 inch length of the jaws 104, 106 when a single block having length of 1.5 inches (measured along the x axis as shown in FIG. 3) was placed at the extreme end of the slot 112 and a 250 lb clamping force was applied. This is a desirable attribute for assembling the fluidic blocks 300 because it permits a technician building a "short" assembly (i.e., only a few blocks) to place the blocks toward one end of the slot 112 whereby the nuts 312 are more accessible.

Figure 6:
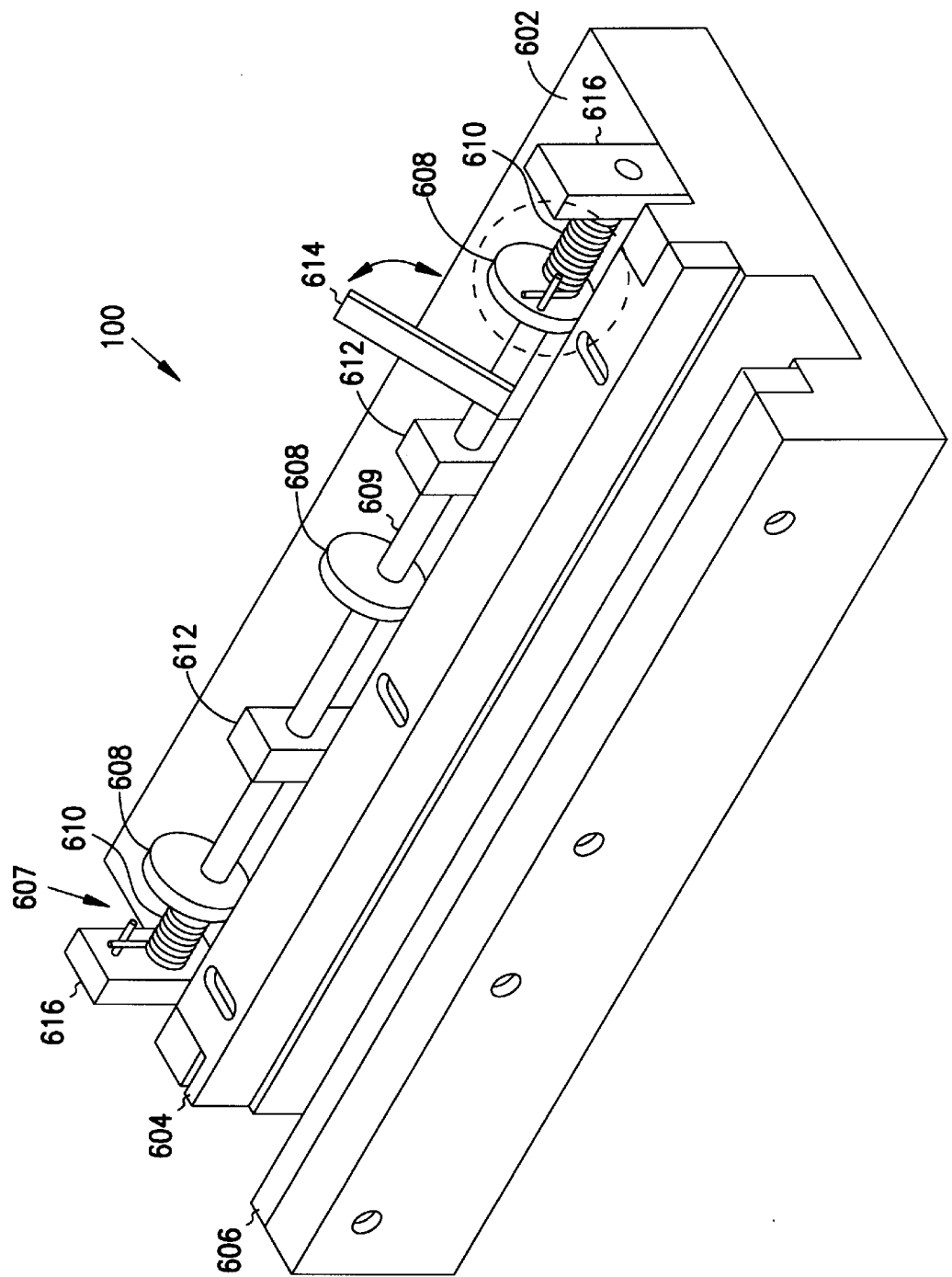
FIG. 6 is a perspective view illustrating another embodiment of a precision clamping device constructed in accordance with the present invention.
Figure 7:
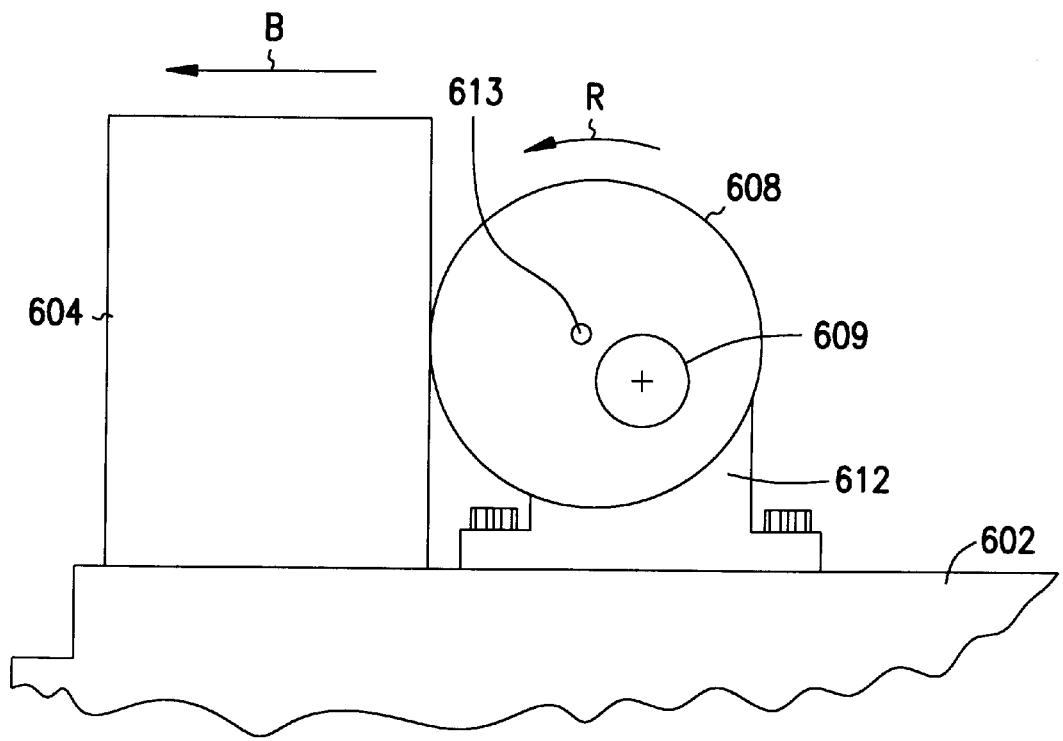
FIG. 7 is a side elevational view of a portion of the precision clamping device of FIG. 6.
Figure 8:
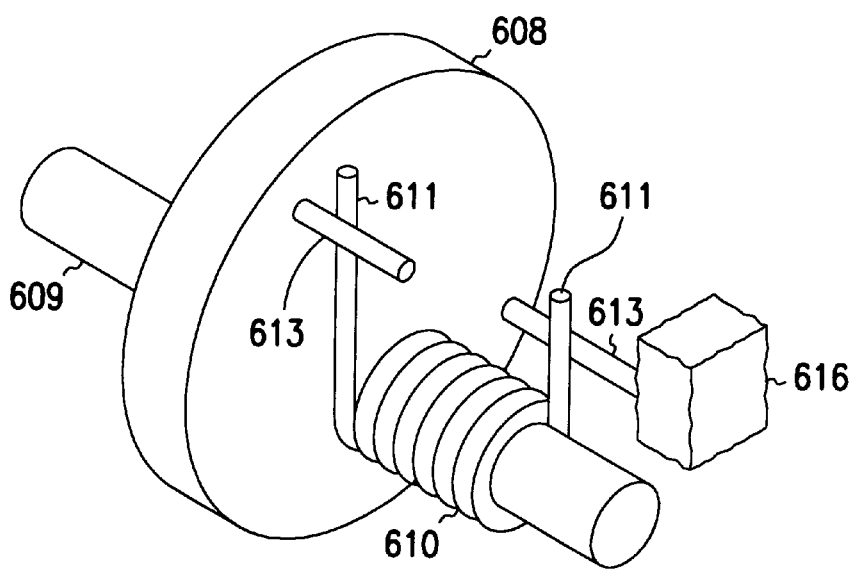
FIG. 8 is a partial perspective view of a portion of the clamping device of FIG. 6 showing a torsion spring and camming surface in accordance with another embodiment of the invention.

While the present invention has been described with reference to a particular embodiments utilizing a series of interengaging ramps to create the multiple load points and displacing motion and a compression spring to create the biasing force, other embodiments may also be used without departing from the scope of the invention. For example, FIGS. 6–8 illustrate a clamping device 100 comprising a base 602, a movable jaw 604, and a fixed jaw 606. A displacing mechanism 607 is also provided which includes one or more camming members 608 attached to one or more cam shafts 609. As clearly shown in FIG. 7, the camming member 608 is eccentrically mounted to the cam shaft 609 such that, as the cam shaft is rotated in the "R" direction, the camming member 608 slides against the movable jaw 604 and displaces the latter in the "B" direction. Unlike the movable jaw 104, the movable jaw 604 has a planar face to better engage the camming members. The camming members 608 may be generally circular (but eccentrically located from the cam shaft 609) as shown in FIG. 7 or, alternatively, have a more conventional cam shape as shown in FIG. 8.

The cam shaft 609, in one embodiment, is biased in the "R" direction by a biasing mechanism 607 comprising one or more conventional torsion springs 610. As shown in FIG. 8, the torsion spring(s) 610 have two extending ends 611 which engage retaining pins 613 on the camming members 608 and the retaining blocks 616 (the latter only partially shown for clarity). By strategically positioning the retaining pins 613, the torsion springs induce a torque into the cam shaft 609. The torque causes the cam shaft and camming members 608 to rotate in the "R" direction (see FIG. 7). In response, the movable jaw moves in the "B" direction and clamps an object or group of objects placed within the clamping device.

Supporting the cam shaft 609 is a series of bearing blocks 612 (see FIG. 6). In addition, the retaining blocks 616 may also act as bearings. A lever 614 may be provided to permit the operator to manipulate the cam shaft 609 as required (i.e., by pivoting the lever 614, the clamp load may be relieved).

The biasing mechanism 607 may be adjustable to permit varying clamp loads to be applied. For example, the retaining pins 613 may be adjustably positioned on either the retaining blocks 616, the camming members 608, or both. By adjusting the position of the pins 613, the amount of twisting deflection of the spring(s) 610, and thus the magnitude of the torque imparted to the camming members 608, may be altered.

While shown utilizing torsion springs with adjustable retaining pins 613, other biasing mechanisms and other adjustment methods may also be used without departing from the scope of the invention. For example, the cam shaft 609 could include a tangential extension (not shown) which engages a simple tension or compression spring (also not shown). By controlling the spring extension/compression, the biasing force, and thus the clamp force, could be accurately selected.

While shown with several camming members 608, a device 100 having a cam shaft 609 with one continuous camming member 608 is also possible without departing from the scope of the invention. Like the multiple camming members, one continuous camming member would provide more than a single point of loading to the movable jaw 604.

Advantageously, the embodiments described herein provide a device that allows for a repeatable, consistent, and controllable clamp force to be applied to a group of objects such as fluidic blocks. Furthermore, the device permits movement of the blocks transverse to the clamp load even while subjected to the clamp load. The consistent force allows for the fluid passages of the blocks to be precisely aligned and coupled, thereby preventing leakage of potentially toxic and corrosive gases.

Exemplary embodiments of the present invention are described above. Those skilled in the art will recognize that many embodiments are possible within the scope of the invention. Variations, modifications, and combinations of the various parts and assemblies can certainly be made and still fall within the scope of the invention. The scope of the invention should, therefore, be determined with reference to the appended claims along with the full scope of equivalents to which such claims are entitled.

What is claimed is:

1. A precision clamping device comprising:
   a first clamp face;
   a second clamp face, the second clamp face being fixed in an opposing, substantially parallel relationship to the first clamp face;
   a displacing mechanism adapted to move the first clamp face toward the second clamp face, wherein the second clamp face remains substantially parallel at all times to the first clamp face; and
   a biasing mechanism coupled to the displacing mechanism, wherein the biasing mechanism is adapted to provide a substantially repeatable clamp force to an object or group of objects placed between the first clamp face and the second clamp face.

2. The precision clamping device of claim 1 wherein the biasing mechanism includes an adjustment feature adapted to permit adjustment of the clamp force.

3. The precision clamping device of claim 1 wherein the first clamp face and the second clamp face comprise a friction reducing surface thereon adapted to permit movement of the objects in a direction transverse to the clamp force during application of the clamp force.

4. The precision clamping device of claim 1 wherein the displacing mechanism includes one or more ramps that translate motion in a first direction into motion of the clamp faces towards one another.

5. The precision clamping device of claim 1 wherein the displacing mechanism includes one or more camming members that translate rotational motion into motion of the clamp faces towards one another.

6. A precision clamping device comprising:
   a fixed jaw having a first clamp face;
   a movable jaw having a second, opposing clamp face substantially parallel to the first clamp face, the movable jaw adapted to move in a first direction whereby the second clamp face moves towards the first clamp face, wherein the movable jaw has a first plurality of inclines each having a first angle; and
   a slide member having a second plurality of inclines each having a second angle, the slide member adapted to move in a second direction transverse to the first direction, wherein the second plurality of inclines is in sliding engagement with the first plurality of inclines such that the movable jaw moves in said first direction in response to movement of the slide member in said second direction.

7. The precision clamping device of claim 6 wherein the first clamp face remains parallel at all times to the second clamp face.

8. The precision clamping device as recited in claim 6, further comprising a displacing mechanism adapted to selectively move the slide member in the second direction.

9. The precision clamping device as recited in claim 8, wherein the displacing mechanism further comprises a biasing mechanism adapted to bias the slide member in the second direction and produce a substantially repeatable clamp force to a one or more objects positioned between the first and second clamp faces.

10. The precision clamping device as recited in claim 6, wherein the first angle is substantially equal to the second angle.

11. The precision clamping device as recited in claim 10, wherein the first angle and the second angle are at least 10 degrees.

12. The precision clamping device as recited in claim 6, further comprising a friction reducing surface disposed on the first and second clamp faces.

13. The precision clamping device as recited in claim 9, wherein the biasing mechanism is adapted to apply 250 pounds of clamp force to the one or more objects disposed between the first and second clamp faces.

14. A tool for applying a uniform clamping force to one or more objects comprising:
   a fixed jaw having a first clamp face;
   a movable jaw having a second, opposing clamp face substantially parallel to the first clamp face, the movable jaw adapted to move in a first direction whereby the second clamp face moves towards the first clamp face, wherein the movable jaw has a first plurality of inclines each having a first angle; and
   a slide member having a second plurality of inclines each having a second angle substantially equal to the first angle, the slide member adapted to move in a second direction transverse to the first direction, wherein the second plurality of inclines is in sliding engagement with the first plurality of inclines such that the movable jaw moves in said first direction in response to movement of the slide member in said second direction.

15. The tool of claim 14 further comprising a base operably supporting the slide member, movable jaw, and fixed jaw.

16. The tool as recited in claim 15, further comprising a displacing mechanism operatively coupled with the slide member, the displacing mechanism adapted to selectively move the slide member in the second direction.

17. The tool of claim 16 wherein the displacing mechanism comprises:
   a handle pivotally connected to the base at a base pivot;
   a shaft adapted for movement parallel to the slide member;
   a link having a first end pivotally connected to the handle at a first pivot and a second end pivotally connected to the shaft at a second pivot wherein pivotal motion of the handle about the base pivot results in linear movement of the shaft;
   a connection member attached to the slide member, the connection member having a shaft aperture to receive the shaft in sliding engagement; and
   a biasing mechanism to bias the slide member in the second direction.

18. The tool of claim 17 wherein the biasing mechanism is disposed between the shaft and the connection member to bias the connection member and the attached sliding member in the second direction and produce a substantially repeatable clamp load to one or more objects positioned between the first and second clamp faces.

19. The tool of claim 18 wherein the biasing mechanism is a spring.

20. The tool of claim 19 wherein the shaft further comprises an intermediate protrusion to retain the spring.

21. The tool of claim 20 wherein the intermediate protrusion is adjustable relative to the shaft.

22. The tool of claim 14 wherein the first and second clamp faces have a friction reducing surface thereon adapted to permit sliding of the objects in a direction transverse to the clamp force during application of the clamp force.

23. A tool for applying a uniform clamping force comprising:
   a fixed jaw having a first clamp face;
   a movable jaw having a second, opposing clamp face substantially parallel to the first clamp face, the movable jaw adapted to move in a first direction whereby the second clamp face moves towards the first clamp face, wherein the movable jaw has a first plurality of inclines each having a first angle, and wherein an opening is provided between the first clamp face and the second clamp face, the opening adapted to receive a plurality of fluidic blocks therein;
   a slide member having a second plurality of inclines each having a second angle substantially equal to the first angle, the slide member adapted to move in a second direction transverse to the first direction, wherein the second plurality of inclines is in sliding engagement with the first plurality of inclines such that the movable jaw moves in said first direction in response to movement of the slide member in said second direction; and
   a base operatively supporting the fixed jaw, movable jaw, and slide member.

24. The tool as recited in claim 23 wherein the movable jaw has first guiding features that permit movement of the movable jaw in the first direction but prohibit movement in the second direction.

25. The tool as recited in claim 23 wherein the slide member has second guiding features that permit movement of the slide member in the second direction but prohibit movement in the first direction.

26. The tool as recited in claim 23, further comprising a displacing mechanism operatively coupled with the slide member, the displacing mechanism adapted to selectively move the slide member in the second direction.

27. The tool as recited in claim 26, wherein the displacing mechanism further comprises a biasing mechanism to bias the slide member in the second direction, thus applying a repeatable clamp force to the plurality of fluidic blocks.

28. The tool of claim 27 wherein the first and second clamp faces further comprise a low friction surface wherein the fluidic blocks can slide transversely to the first and second clamp faces while subjected to the clamp force.

29. The tool of claim 23 further comprising a first ledge proximal the first clamp face and a second ledge proximal the second clamp face, wherein the first and second ledges are substantially coplanar and are adapted to receive the fluidic blocks thereon.

30. A precision clamping device comprising:
   a fixed jaw having a first clamp face;

a movable jaw having a second, opposing clamp face substantially parallel to the first clamp face, the movable jaw adapted to move in a first direction whereby the second clamp face moves towards the first clamp face, wherein the second clamp face remains substantially parallel at all times to the first clamp face; and a displacing mechanism comprising one or more camming members, the camming members adapted to contact the movable jaw on a side opposite the second clamp face, wherein the camming members displace the movable jaw in the first direction.

31. The precision clamping device of claim 30 wherein the first clamp face remains parallel at all times to the second clamp face.

32. The precision clamping device as recited in claim 30 wherein the displacing mechanism further comprises a biasing mechanism adapted to bias the camming members and produce a substantially repeatable clamp force to one or more objects positioned between the first and second clamp faces.

33. The precision clamping device as recited in claim 30, further comprising a friction reducing surface disposed on the first and second clamp faces.

34. The precision clamping device as recited in claim 32 wherein the biasing mechanism is adapted to apply 250 pounds of clamping force to the one or more objects disposed between the first and second clamp faces.

35. The precision clamping device as recited in claim 32 wherein the biasing mechanism further comprises one or more torsion springs.

* * * * *